I. LEHMANN.
Manufacture of Glass-Buttons.
No. 197,869. Patented Dec. 4, 1877.
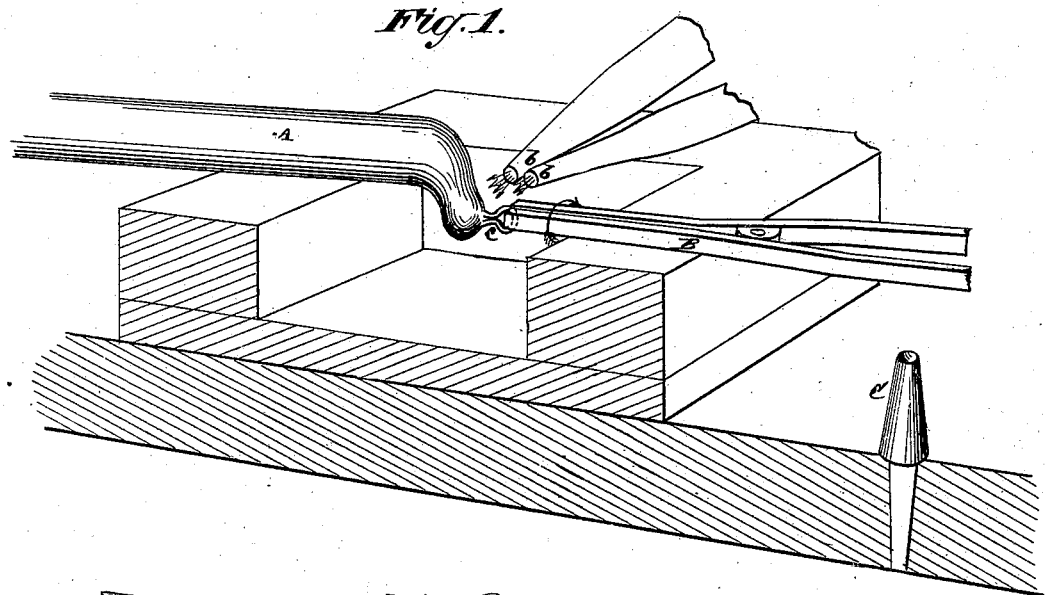
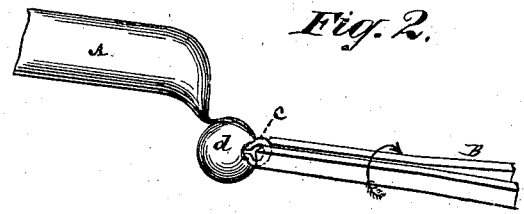
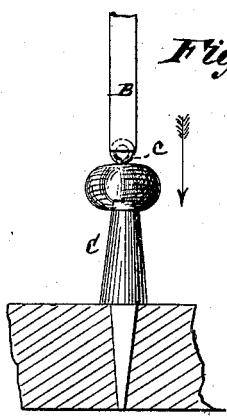
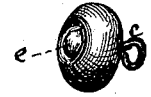
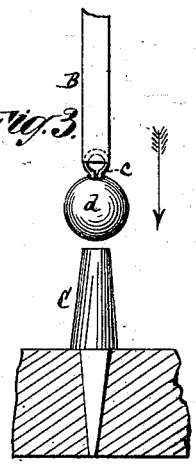
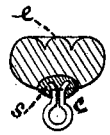
Witnesses
John Becker
Fred Haynes
Inventor
Isaac Lehmann
by his Attorneys
Brown & Allen

UNITED STATES PATENT OFFICE.

ISAAC LEHMANN, OF NEW YORK, N. Y.

IMPROVEMENT IN THE MANUFACTURE OF GLASS BUTTONS.

Specification forming part of Letters Patent No. 197,869, dated December 4, 1877; application filed November 19, 1877.

*To all whom it may concern:*

Be it known that I, ISAAC LEHMANN, of the city and State of New York, have invented a new and useful Improvement in the Manufacture of Glass Buttons, of which the following is a description, reference being had to the accompanying drawings, forming part of this specification.

This invention has for its object the production of a glass button of approximately spheroidal form, but flattened on its face, or face and back, thus causing it to assume the shape of an oblate spheroid, and having its face ornamented by any suitable indentation or impression, to give the button a "fancy" character.

The invention consists in a novel process of producing such a button in a cheap and rapid manner, without the aid of divided molds or machinery, and so that the button shall present no seam, joint, or sharp edges or projections liable to cut or requiring subsequent removal.

Figure 1 of the drawings represents a view, in perspective, of means for heating the glass stick from which the buttons are to be made, and for working the glass about the shank of the button, in illustration of the first stage of the process, said view also showing a tool or presser for flattening and ornamenting the face of the button. Fig. 2 is a view in perspective, illustrating further progress of the work during the first stage of the process. Figs. 3 and 4 are views in elevation, in illustration of the second and finishing stage of the process. Fig. 5 is a view, in perspective, of a button as made by my improved process; and Fig. 6, a sectional view of the same in direction of the length of the shank of the button.

In the first stage of the process the glass is spun or worked round the shank of the button, much in the same way as spherical glass buttons are made—that is to say, a stick of glass, A, is exposed at its one end to the action of a flame, (as, for instance, by gas-jets $b\ b$,) for the purpose of bringing the glass into a plastic, workable state. A pinchers, B, holding the shank $c$ of the button, is then held by the hand of the operator, and the inner end of the shank inserted in the heated end of the glass rod, which is spun or worked around the shank by turning the pinchers round and round until a glass sphere, $d$, is produced, as in Fig. 2.

But a button of a globular form is not the kind of button which is here designed to be produced, and would not be suited to the same articles of wear or purposes that a flat button would, or one of an oblate-spheroidal form, which, for many purposes, is superior to a flat button. Accordingly, to produce a button of approximately oblate-spheroidal form, without seam or joint, and requiring no after-dressing to remove sharp edges or projections, also that shall have a fancy character or be ornamented on its face, I take the sphere $d$, as it is spun or worked from the glass stick, and subject it to pressure, by hand, on its side opposite the shank, of or by a tool, C, constructed to flatten and indent or ornament the face $e$ of the button. This is done by bringing the spherical body, $d$, of glass, while hot and plastic or workable, down onto the tool C, which is of the necessary form required at its end for the ornamentation of the button on its face, and which finishes the button, leaving it of a uniform approximately oblate-spheroidal form, with a fancy pattern on its face, and having no sharp or cutting edges to injure the edges of the hole with which the button is designed to engage.

The pattern or ornamentation of the button on its face may be greatly varied, and, when desired, a thread or small portion, $s$, of different-colored glass may be spun or worked around the inner end of the shank of the button before inserting it in the heated end of the glass stick, to produce a more marked or effective ornamentation, as seen through the transparent body of the button from its face side.

I claim—

The process of making glass buttons by subjecting the hot glass, while plastic and after it has been spun or worked in a heated state around the shank of the button, to pressure, on the face of the latter, of or by a tool constructed both to flatten and to ornament said face, whereby a glass button of oblate-spheroidal form, and ornamented on its face, free from seam or joint and sharp edges or projections liable to cut or requiring subsequent removal, is produced, substantially as specified.

ISAAC LEHMANN.

Witnesses:
FRED. HAYNES,
EDWARD B. SPERRY.